United States Patent [19]

Kobayashi et al.

[11] Patent Number: 5,044,291

[45] Date of Patent: Sep. 3, 1991

[54] STITCH PATTERN SELECT/INPUT SYSTEM IN SEWING MACHINE

[75] Inventors: Fumihiko Kobayashi; Yoshiaki Sakata; Takumi Ando, all of Tokyo; Toru Hyodo, Kanagawa, all of Japan

[73] Assignee: Janome Sewing Machine Co., Ltd., Tokyo, Japan

[21] Appl. No.: 552,252

[22] Filed: Jul. 12, 1990

[51] Int. Cl.$^5$ .............................................. D05B 3/02
[52] U.S. Cl. .................................... 112/445; 112/458
[58] Field of Search ............... 112/458, 445, 453, 456, 112/457, 121.11, 121.12

[56] References Cited

U.S. PATENT DOCUMENTS

| | | | |
|---|---|---|---|
| 4,512,271 | 4/1985 | Herdeg et al. | 112/445 |
| 4,672,903 | 6/1987 | Kato | 112/457 |
| 4,860,678 | 8/1989 | Skogward | 112/445 |
| 4,942,836 | 7/1990 | Sano et al. | 112/445 |

Primary Examiner—Peter Nerbun

Attorney, Agent, or Firm—Dann, Dorfman, Herrell and Skillman

[57] ABSTRACT

A front operation panel is provided on a housing of an electrically controlled sewing machine, which provides a pattern list indicating a plurality of stitch patterns in a specific pattern group. One of the stitch patterns may be selected in direct reference to the pattern indication and the selected one is represented in a display section in the operational panel. The operational panel comprises a display board having the pattern list and the display section and a transparent cover superposed on the display board which includes a plurality of pressure-sensitive elements to be selectively depressed to designate the pattern indication in the pattern list. The display board may be switched to another information menu which is applicable to input operation of an original stitch pattern by successively inputting needle dropping points which should be enough to define a configuration of the original stitch pattern. The original stitch pattern thus registered may be included in the pattern list, which will now become selectable by depression of the corresponding elements in the transparent cover.

2 Claims, 8 Drawing Sheets

STITCH PATTERN SELECT/INPUT SYSTEM IN SEWING MACHINE

BACKGROUND OF THE INVENTION

1. Filed of the Invention

This invention relates in general to an electrically controlled sewing machine capable of producing a desired stitch pattern in response to stitch control data thereof stored in advance therein. In particular, this invention relates to a stitch pattern select system suitably employed in the sewing machine of such type.

2. Description of the Prior Art

Various kinds of electrically controlled sewing machine have been proposed, which will in advance store stitch control data for a plurality of stitch patterns, a selective one or combination of which may be produced in accordance with the stitch control data therefor. To facilitate the pattern select operation, the sewing machine housing is provided with a pattern list for representing the stitch patterns which may be produced with the sewing machine, a key arrangement or the like to be manipulated to select a desired one of the stitch patterns among those appearing on the pattern list and a display for representing the selected stitch pattern.

With an increasing need for the stitchable patterns, it has become difficult for all of the stitchable patterns to be represented in the pattern list which is usually arranged on a front portion of the machine housing, providing a limited space. To cope with this, it has been proposed that the stitchable patterns are selectable by designation of corresponding pattern numbers. This pattern select system is space-saving but would often result in erroneous designation of the stitch patterns.

Apart from the number of stitch patterns registered in advance in the sewing machine, the sewing machine may be required to produce an original stitch pattern upon the operator's need. The stitch control data for such an original stitch pattern should be determined by sequentially designating needle dropping points which will be enough to define the stitch pattern. Such input device for origination of stitch patterns has also been proposed. However, the conventional input device would require a considerable space or be arranged as a separate unit connectable to the sewing machine.

SUMMARY OF THE INVENTION

It is therefore an object of this invention to provide an improved pattern select system capable of designating a selective one or combination of stitch patterns among those previously registered in an electronically controlled sewing machine.

Another object of this invention is to provide a novel pattern input device used in combination with the sewing machine, which can be operated simply and requires a minimum of space in a front, accessible portion of the machine housing.

These and other objects are achieved by providing a display means having two different information menus, one for designating a desired stitch pattern to be selected from those already registered in memory means and the other for inputting an original stitch pattern to be newly registered in the memory means. The display means includes a plurality of indications or keys which may be selectively designated in the pattern selecting operation or the pattern originating operation.

In accordance with an aspect of this invention there is provided a stitch pattern select system for use in an electronically controlled sewing machine having first memory means for storing stitch control data for a plurality of stitch patterns; second memory means for storing display control data for the stitch patterns; and stitch forming means for producing every stitch of the stitch pattern in response to the stitch control data thereof; said system comprising display means partitionable into a pattern list section for representing the stitch patterns having the stitch control data stored in said first memory means and a pattern display section for representing the selected stitch pattern; and input means providing a plurality of operating keys and cooperating with said pattern list section in said display means such that a specific one of the listed stitch pattern may be selected by designation of a corresponding one of said operating keys, said stitch pattern thus selected being represented in said pattern display section in response to the display control data thereof stored in said second memory means.

In accordance with another aspect of this invention there is provided a stitch pattern select/input system in an electronically controlled sewing machine having first memory means for storing stitch control data for a plurality of stitch patterns; second memory means for storing display control data for the stitch patterns; and stitch forming means for producing every stitch of the stitch pattern in response to the stitch control data thereof; said system comprising display means on which a selective one of first and second information menus appears, said first information menu being partitioned into a pattern list section for representing the stitch patterns having the stitch control data stored in said first memory means and a pattern display section for representing the selected stitch pattern, said second information menu being applicable to input of a series of needle dropping points to originate a stitch pattern; switch means for switching operational conditions of said display board between said first and second information menus; input means providing a plurality of operating keys and cooperating with display means; and control means for controlling operation of said input means in dependence upon the information menu now appearing on said display means such that by designation of a corresponding one of said operating keys, a specific one of the stitch patterns listed in said pattern list sections may be selected when said display means is operable in said first information menu, said stitch pattern thus selected being represented in said pattern display section in response to the display control data thereof stored in said second memory means, and when said display means is operable in said second information menu, each needle dropping point for defining the stitch pattern to be originated may be registered at a desired point, said originated stitch pattern being registrable in said first and second memory means which will be selectable in said first information menu of said display means.

BRIEF DESCRIPTION OF THE DRAWINGS

Further objects and advantages of this invention can be fully understood from the following detailed description when read in conjunction with the accompanying drawings in which.

DETAILED DESCRIPTION OF THE EMBODIMENT

Figures 3, 4:
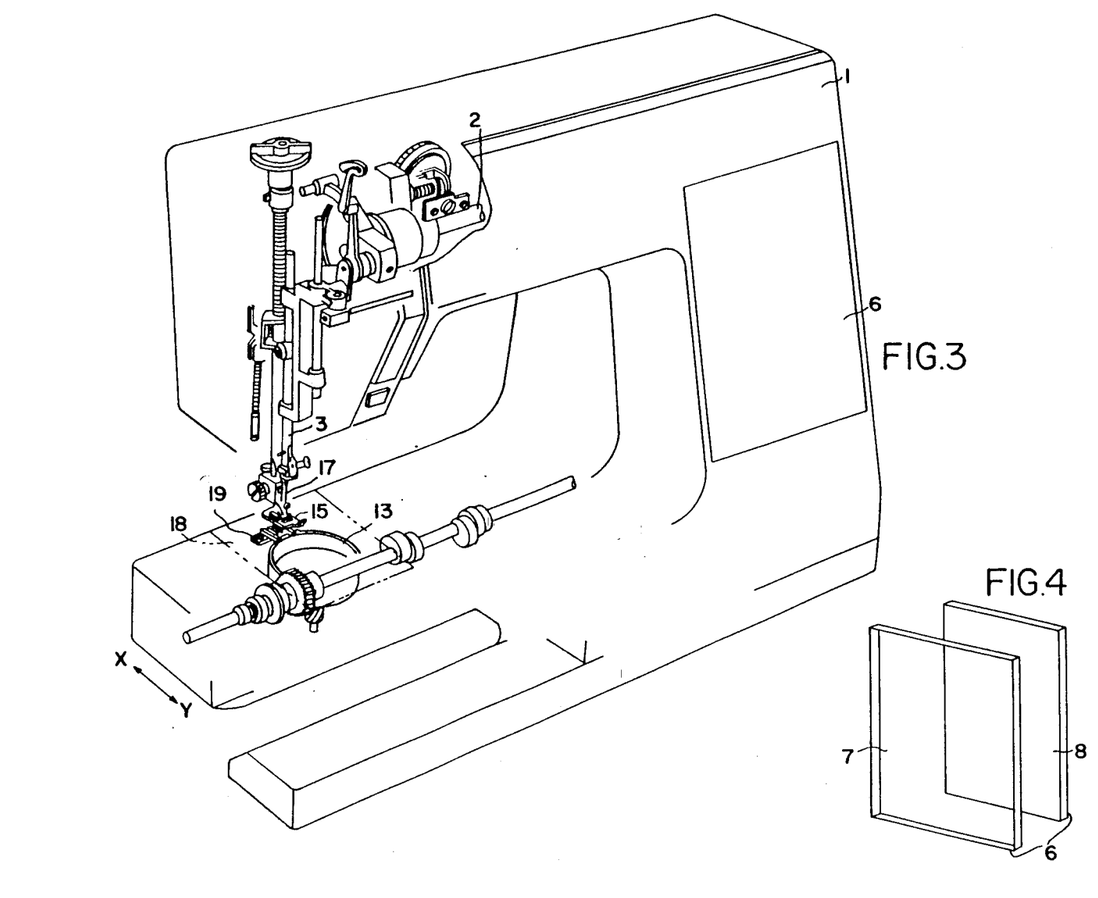
FIG. 3 is a perspective view showing a brief construction of the sewing machine.
FIG. 4 is an exploded view of a front operation panel attached to the sewing machine.

An electronically controlled sewing machine to which a stitch pattern select system embodying the invention is applied will be first described in reference to FIG. 3, which is encased by a machine housing 1. A main drive shaft 2 is supported in an upper horizontal extending portion of the housing 1 and rotated at a given speed by an electromotor (not shown) mounted in the housing 1. To an end of the main drive shaft 2 is connected a needle bar 3 which is allowed to laterally swing within a predetermined amplitude as well as to reciprocate in a vertical direction. A stitch needle 17 carrying an upper thread (not shown) is secured to the tip end of the needle bar 3.

A lower bed portion of the housing 1 extending horizontally substantially in parallel with the upper arm portion includes a detachable needle plate 18 located in opposition of the needle 17. The needle plate 18 has a needle hole (not shown) through which the needle 17 is allowed to pass during vertical reciprocation thereof. A workpiece or fabric is placed on the needle plate 18 and fed in X-Y directions by cooperation of a presser foot 15 supported by the upper arm portion of the housing 1 to exert a downward, frictional force and a feed dog 19 driven to be intermittently projected above the needle plate 18, in a conventionally known manner. Below the needle plate is arranged rotatably a loop taker 13 which cooperates with the needle 17 to interlock the upper thread carried therealong with a lower thread supplied from a bobbin (not shown) contained in the loop taker 13, thereby forming a stitch on the fabric in a conventional manner.

An operation panel 6 of double layer construction comprising a transparent cover 7 and a underlying quartz display board 8 as clearly seen in FIG. 4, is disposed on an upstanding neck portion of the housing 1.

Figure 1:
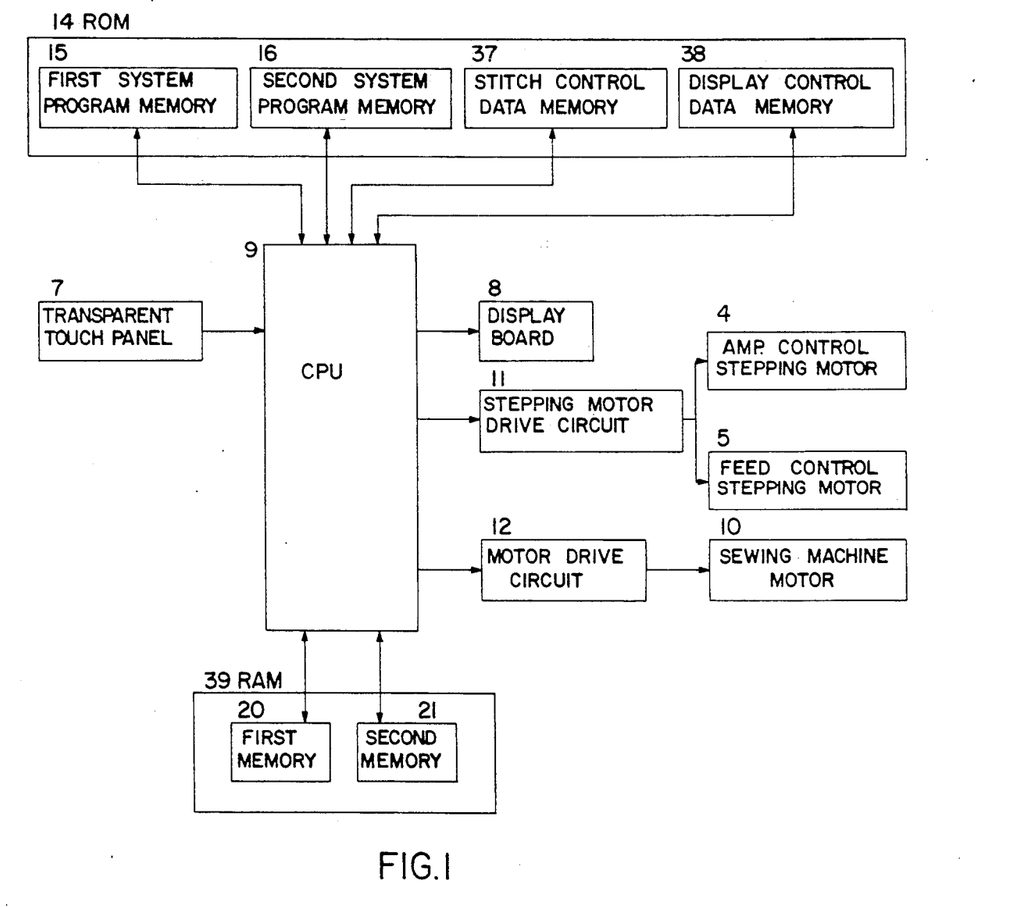
FIG. 1 is a block diagram representing an overall construction and arrangement of a system when applied to an electronically controlled sewing machine.

An overall control system in the sewing machine will be described in reference to a block diagram of FIG. 1.

There is provided a microcomputer or central processing unit (CPU) 9 in the housing 1, which is operative in response to stitch control data stored in a read-only-memory (ROM) 37 to drive under control, via a stepping motor drive circuit 11, stepping motors 4 and 5 for the control of needle amplitude and fabric feed, respectively, thereby forming each stitch of a stitch pattern being now produced on the fabric. Display data of each of stitchable patterns is stored in another ROM 38, which is selectively input to CPU 9 for diagrammatically representing a pattern configuration of a selected stitch pattern. Read-out control system programs and display control system programs, to be described in detail hereinlater are stored in ROM's 15 and 16, respectively. These ROM's 15, 16, 37 and 38 may be sectioned in a single ROM 14.

The stitch control data of the selected stitch pattern read out from ROM 37 is transmitted via CPU 9 to a random-access-memory (RAM) 20 to be temporarily stored therein. Pattern originating data to be described in detail hereinlater will be temporarily stored in another RAM 21. These RAM's may be sectioned in a single RAM means 39.

Figure 7:
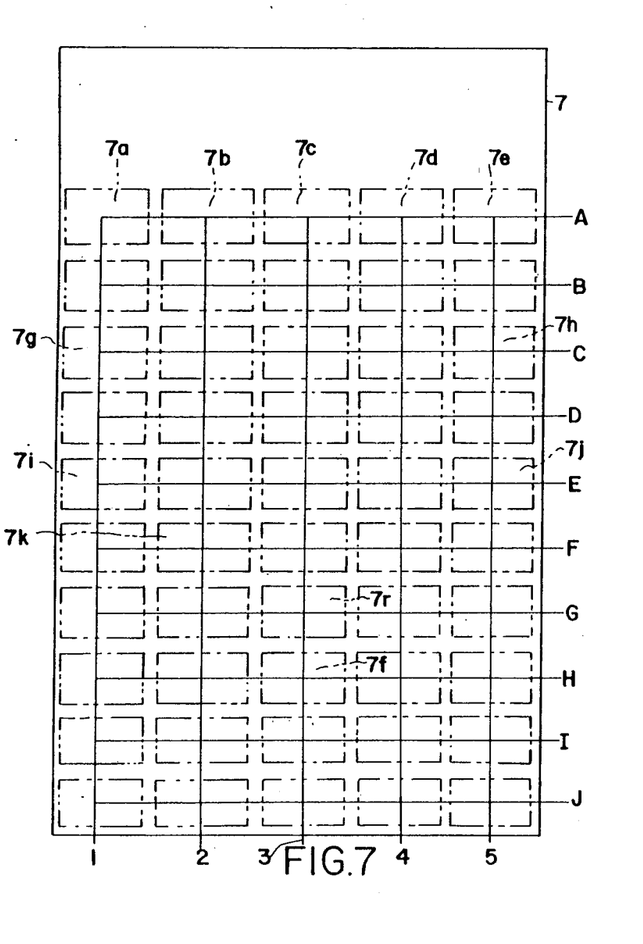
FIG. 7 is an explanatory view of a transparent cover of the front operation panel.

The operation panel 6 comprises the display board 8 and the overlying cover 7 of a transparent, flexible material. The display board 8 provides a regularly arranged information menu which can be seen from the outside of the panel 6 through the transparent cover 7 and selectively designated by depression of a corresponding section in the cover 7. In the illustrated embodiment, as best seen in FIG. 7, the cover 7 is provided with ten transverse signal lines A to J and five longitudinal signal lines 1 to 5, providing fifty intersections 7a to 7k...7r... at which points pressure-sensitive elements are respectively located. Thus, fifty oblong areas each defined by imaginary lines are regularly arranged in the transparent cover 7, which will correspond to the information menu depicted on the display board 8. For example, the leftmost information in the uppermost row appearing on the display board 8 may be designated by depression of the pressure-sensitive element located at the intersection 7a.

Figure 5:
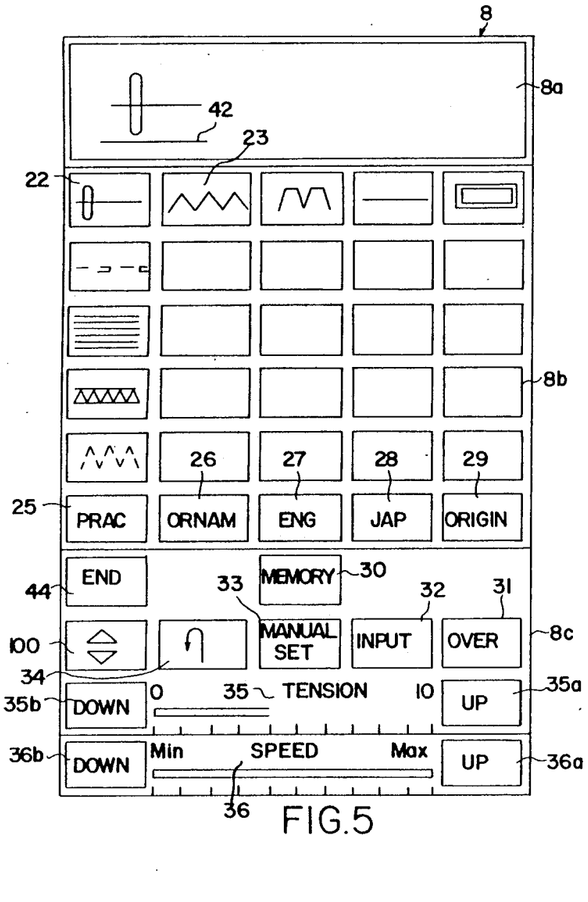
FIG. 5 is an explanatory view of a display board of the front operation panel on which one operation mode thereof appears.

The display board 8 presents a selective one of first and second information menus. The first information menu will appear when the operator desires to select a specific one of stitch patterns among a selected one of preclassified groups of stitch patterns having the stitch control data already stored in the sewing machine (in ROM 37). The first information menu includes a pattern display area 8a representing on an enlarged scale a selected one of the stitchable patterns, a pattern list 8b presenting a list of stitchable patterns in a specific pattern group, and a functional key arrangement 8c to be selectively designated to control stitch conditions. FIG. 5 shows the first information menu when a key 25 has been designated through the cover 7 to select a practical pattern group of the stitch patterns which will be most frequently chosen in the sewing machine operation. Other first information menus will be selectable by designation of one of other pattern group select keys 26 to 29 which respectively designate an ornamental pattern group, an English character group, a Japanese character group and an original pattern group.

Figure 13:
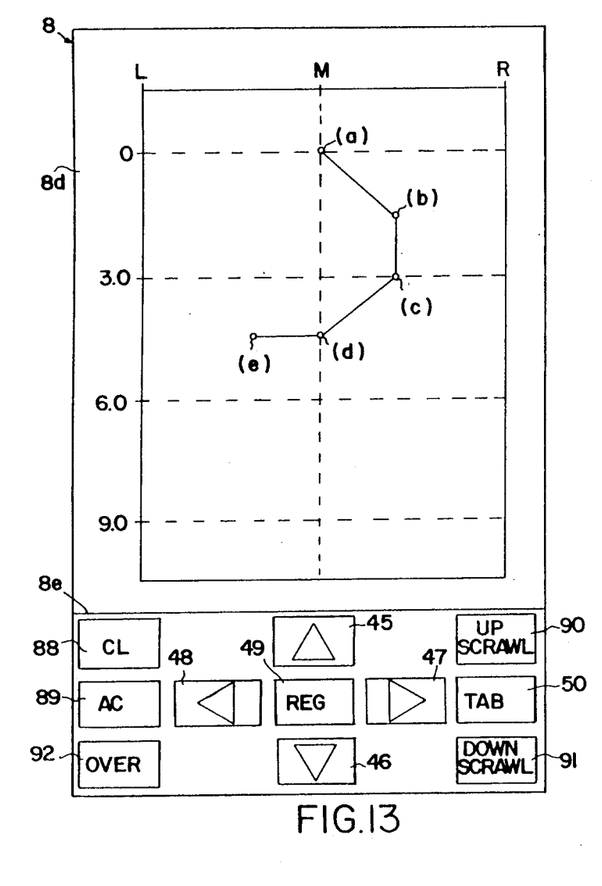
FIG. 13 is an explanatory view of the display board when it has been switched to another information menu suitable to input and origination of a stitch pattern.

The display board 8 will be switched to the second information menu by designation of "INPUT" key 32 when a stitch pattern rather than those previously registered in ROM 37 is to be originated in accordance with the operator's demand. In the second information menu, an upper, major portion of the display board 8 will be used for representing an input condition of a stitch pattern which is now being originated. The input command keys are arranged in a bottom area 8e. One example of the second information menu is illustrated in FIG. 13.

The respective operational keys in the areas 8b and 8c in the first information menu, as well as in the area 8e in the second information menu, will be located in exact correspondence with the oblong areas 7a . . . 7k and 7r . . . defined in the transparent cover 7.

Control operation will proceed in the following manner. Referring specifically to a flow chart of FIG. 2, when (a) power to the sewing machine is switched on, the display 8 will be automatically set to the first information menu for the practical pattern group as shown in FIG. 5 in a first step (a). At the same time, the display control data with respect to the practical pattern group is read out from the system program memory 16. Each display control data includes a first signal to be inputted through CPU 9 to the read-out control system program memory 15 for reading out therefrom the read-out control data and a second signal to be inputted through CPU 9 to the pattern data memory 38 for reading out therefrom the patterns of a selected group which will then be represented in the pattern list 8b on the display board 8. More specifically, when the display control data with respect to the practical pattern group is read out from the system program memory 16 in the step (a), the practical stitch patterns which will be selected with considerable frequency, including a straighaway stitch pattern and a zigzag stitch pattern, are represented in the respective display sections 22, 23 . . . defined in the pattern list 8b on the display board 8 in response to the pattern data stored in the memory 38 which has been read out therefrom in response to the second signal included in the display control data. At the same time, the respective key sections 7a to 7k . . . 7r . . . provided in the transparent cover 7 in correspondence with the display sections in the pattern list 8b on the display board 8 will be determined, in response to the read-out control data stored in the memory 15 which has been read out therefrom in response to the first signal included in the display control data, such that a desired one of the stitch patterns shown in the list 8b may be designated and selected by a slight touching of a corresponding one of the key sections in the transparent cover 7, which overlies indication of the said stitch pattern to be produced, in a second step (b). In the example shown in FIG. 5, the straightaway stitch pattern has been selected by depression of the key section 7a overlying the display section 22 indicating the straightaway stitch pattern, which is represented on an enlarged scale in the pattern display area 8a.

The key arrangement 8c on the display board 8 includes various functional indications to be designated for producing a number of stitch patterns in a sequential manner. "MEMORY" indication 30 corresponds to a memory key provided in a conventional computer sewing machine, which is designated each time the stitch pattern in the desired pattern combination has been selected by designation of a corresponding pattern indication in the list 8b. All of the stitch patterns in the desired pattern combination have been thus designated in due order, which will be represented in the display area 8a, "OVER" indication 31 is designated.

"INPUT" indication 32 is needed when a personal-designed picture or stitch pattern is to be created in the second information menu appearing on the display board 8. "MANUAL SET" indication 33 is provided for manual adjustment of the stitching conditions such as the needle amplitude and the fabric feed amount, which will be automatically determined responsive to the stitch control data stored in the ROM memory 37 but may be adjusted to meet the operator's special requirement. A needle position control 100 is provided to determine if the needle should stop at the upper dead point or the lower dead point when the stitching operation for the combination pattern is over. A return indication 34 is designated if the fabric feeding direction is to be reversed. A thread tension is indicated at 35 which may be adjusted by designation of "UP" and "DOWN" indication 35a or 35b. A rotating speed of a sewing machine motor for driving the main drive shaft is indicated at 36 which may be adjusted by designation of "UP" and "DOWN" indication 36a or 36b.

Figure 2:
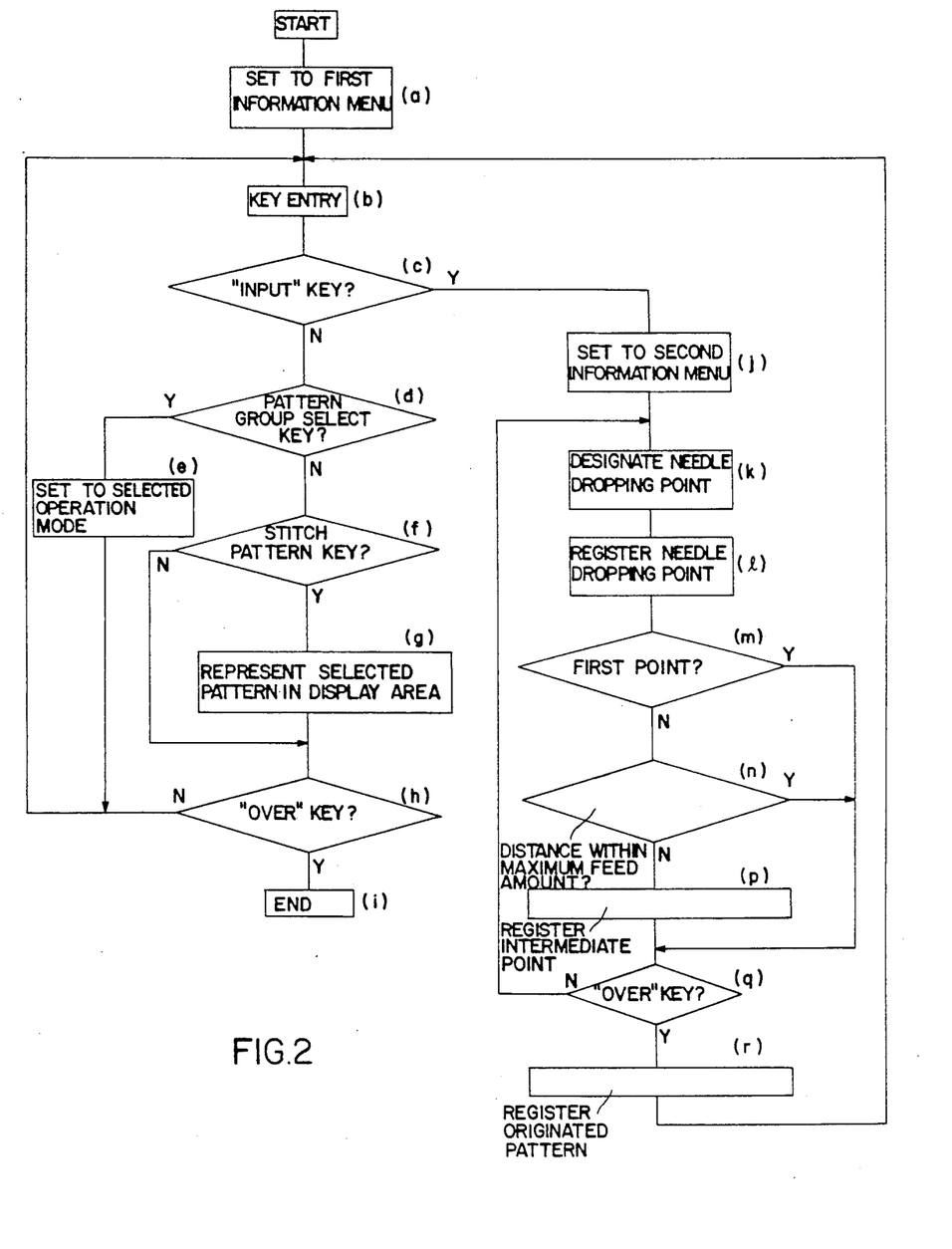
FIG. 2 is a flow chart of a control operation performed by the system.

Turning to the flow chart in FIG. 2, there is some key entry in the step (b). It is to be noted that the pattern input operation will be somewhat different between the first and second information menu. More particularly, in the first information menu adapted to input a selective one among those appearing on the list 8b on the display board 8, this can be done by simply depressing a corresponding one of the key sections in the cover 7. In the second information menu, an example is illustrated in FIG. 13, which is applicable to the input operation for originating a personal-use pattern not registered in advance in the sewing machine. Next in a step (c), it is discriminated if the entry key designated in the preceding step (b) is "INPUT" 32 which commands that the information menu appearing on the display board 8 be changed to the second one for originating a stitch pattern which has not yet registered in the ROM memory 37.

Figure 6:
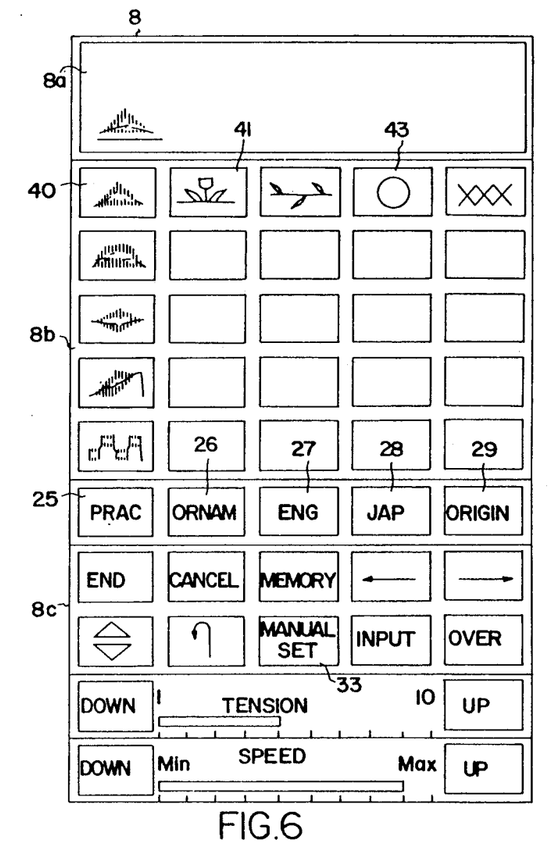
FIG. 6 is an explanatory view of the display board showing another operation mode.

Provided that it is not discriminated in the step (c) that "INPUT" has been designated, the step goes forward to a step (d) in which it is discriminated if the entry key is located on the transverse signal line F overlying the mode renewal keys 25 to 29. If so, the operation mode is changed as designated in a step (e), awaiting further key entry in the step (b). For example, when the step (e) discriminates that "ORNAMENT" indication 26 has been designated, the operation mode of the display board 8 is changed to that as shown in FIG. 6, though still remaining in the first information menu, and the pattern control data for the ornamental pattern group is read out from the ROM memory 16. A plurality of the registered ornamental stitch patterns are indicated in display sections 40 to 43 . . . which may selectively be designated by depression of a corresponding key section located in the cover 7, in like manner as in the aforementioned case wherein the display board 8 has the operation mode for the practical pattern group. For example, when the key section 7a located above the display section 40 in the list 8b is in this operation mode, a triangular pattern with the inside densely stitched is designated and indicated in the display area 8a as can be seen in FIG. 6. Depression of the key section 7b will input a flower pattern illustrated in a corresponding display section 41. A circular pattern with the inside left blank may be designated by depression of the key section 7d overlying the display section 43 having a corresponding pattern indication. The stitch pattern thus designated will be produced with the sewing machine by driving the stepping motor drive circuit 11 which is controlled by the stitch control data read out from the ROM memory 37.

Figure 8:
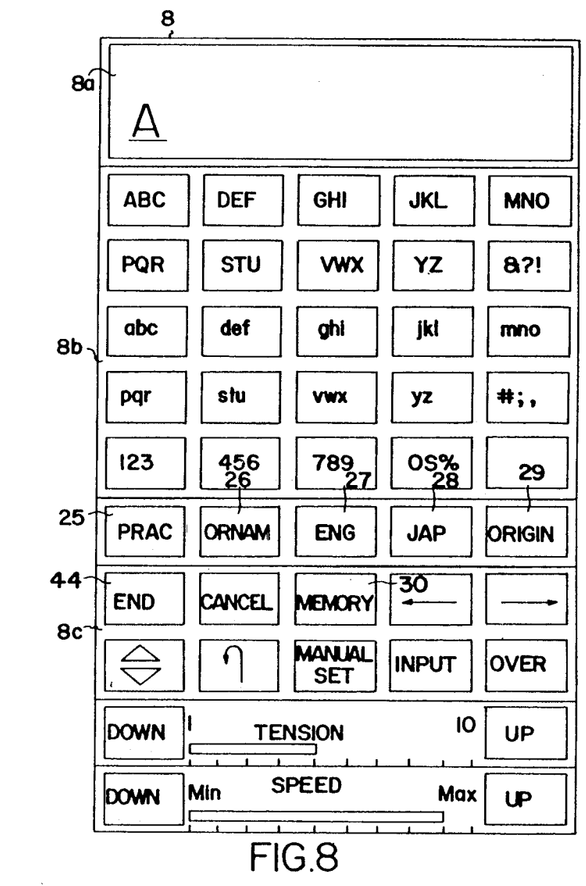
FIG. 8 is an explanatory view of the display board showing still another operation mode.

When "ENGLISH" indication 27 has been designated, the operation mode appearing on the display board 8 will be changed to that shown in FIG. 8 in which an English capital letter "A" is indicated in the display area 8a. Indication of English characters and Arabic figures are arranged in the list 8b in such manner that two or three characters are arranged in a single display section, one of which may be designated by repeated identification of the same display section. For example, when the display section 52 is designated by depression of the key section 7a in the cover 7, a letter "A" is first displayed in the area A as shown in FIG. 8, which will be changed to indication of "B", "C", "A" . . . by repeated depression of the same key section 7a.

Figure 12:
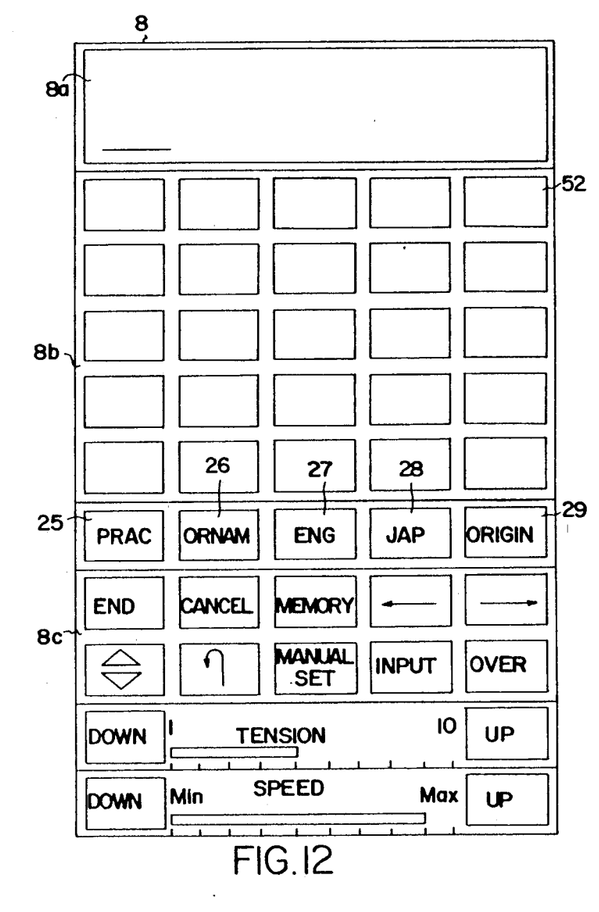
FIG. 12 is an explanatory view of the display board showing yet another operation mode.

When "JAPANESE" indication 28 has been designated, the operation mode of the display board 8 will be changed to that suitable to selective input operation of Japanese characters, which is shown in FIG. 12 by way of example. This mode will be substantially identical to that for the English character and therefore be described in no more detail.

When "ORIGINAL" indication 29 has been designated, the information menu is changed to the second one and the corresponding pattern control data is read out.

If the entry key does not command the mode renewal, which means that the operation mode now appearing on the display board 8 is suitable to input of one of the stitch patterns selectable from those arranged on the list 8b, it is then discriminated in a step (f) if a particular one of the stitch patterns is designated by depression of a corresponding key section in the cover 7. For example, when the capital letter "A" is designated when the display board 8 has been set to provide the English character operation mode, the said letter "A" will be indicated in the display area 8a, as can be seen in FIG. 8, in the next step (g). The underline indicated below the selected character "A" in the display area 8a means that this stitch pattern is being processed for data input, which will disappear when "MEMORY" indication 30 is designated. Thereafter, in a step (h), "OVER" indication 31 is designated so that the stitch control data of the selected stitch pattern which has been read out from the ROM memory 37 will now be transferred to the RAM memory 20 to be temporarily stored therein, in response to which the stepping motor drive circuit 11 is operated to control the needle amplitude and the fabric feed in each stitch to thereby produce the selected stitch pattern on the fabric.

It will be understood that when a combination of stitch patterns is desired to be produced, the steps (b) to (h) are repeated per input of stitch pattern in the combination. When a stitch pattern to be selected is not included in the pattern list 8b currently appearing in the the display board 8, the steps (b) to (d) should be followed by the step (e) to change the operation mode of the display board 8 as desired, and then the pattern select operation will be carried out in the manner described before. Each time the stitch pattern in the combination has been selected, the key section 7r is depressed to designate "MEMORY" indication 30, whereby the stitch control data therefor is stored in the RAM memory 20 and the underline in the display area 8a is shifted to a left adjacent space in which the next stitch pattern will be indicated when selected. After all stitch patterns in the combination have been thus selected and registered, the said pattern combination being indicated in the display area 8a, "END" indication 44 followed by "OVER" indication 31 will be designated so that the sewing machine becomes ready to produce the selected pattern combination on the fabric in response to the stitch control data therefor which will be sequentially read out from the RAM memory 20 in the order stored therein.

When "INPUT" indication 32 is designated in the step (b), which is so discriminated in the step (c), the operation proceeds in accordance with a sub routine starting from a step (j) in which the display board 8 is changed to have the second information menu capable of originating and registering a personal-base stitch pattern. The display control data predetermined for the second information menu is read out from the ROM memory 16. The display control data includes a first signal which causes the display board 8 to have the second information menu as shown in FIG. 13, and a second signal responsive to which the read-out control data for the second information menu is read out from the ROM memory 15 so that an original stitch pattern may be created and registered by a series of slight touchings of the key sections 7a to 7k . . . 7r . . . in the transparent cover 7. The stitch control data of the original stitch pattern being now originated is successively stored in the RAM memory 21, which will be transferred to the ROM memory 37 to be stored therein after a confirmative registration thereof.

As having been described, the second information menu appearing on the display board 8 is divided into a display area 8d representing the input condition of the original stitch pattern now being processed and a functional indication arrangement 8e including 4-way shift indications 45 to 48 for shifting in desired direction respective needle dropping points which defines the original stitch pattern to be registered and "REG" 49 for registering the respective needle dropping points. "TAB" 50 is used in cooperation with one of the shift indications 45 to 48 for skip-shift of the needle dropping point. FIG. 13 shows that the first four needle dropping points (a) to (d) have been registered and the fifth point (e) is now being processed. This point (e) may be shifted by designating the shift indications 45 to 48, the function of which may be enhanced by "TAB" 50, to a desired point at which "REG" is designated for registration of that point. The previously registered point may be erased by designation of "CL" indication 88. All of the previously registered points may be erased at once by designation of "AC" indication 89. When the stitch pattern to be originated should have a length larger than that of the display area 8d, two-way scroll indications 90 and 91 will be required. "L", "M" and "R" appearing on the display area 8d means a leftmost, a middle and a rightmost longitudinal lines in a predetermined maximum amplitude of the stitching needle. Within the extreme width between "L" and "R" lines, the needle dropping point may be registered. The operator may determine the size or length of the stitch pattern to be originated in reference to scales of 0, 3.0, 6.0 and 9.0 in millimeters appearing on the display area 8d.

Turning again to the flow chart in FIG. 2, the needle dropping point is determined in a step (k) and then registered in a step (l), in the above-described manner. Next in a step (m), it is discriminated if the needle dropping point thus registered in the step (l) is the first one of the stitch pattern. If so, the procedure is skipped to a step (q) and then returned to the step (k) for registration of the next point. If not, in the next step (n) it is discriminated if the needle dropping point to be now registered can be actually produced in reference to the predetermined maximum amount by which the fabric may be fed in one-stitch producing operation. More particularly, provided that the last needle dropping point has been registered at a coordinate ($x_1$, $y_1$) and the point to be newly registered is located at another coordinate ($x_2$, $y_2$), the former being defined in the needle swinging direction and the latter in the fabric feeding direction, in the step (n), the distance therebetween in the fabric feeding direction will be the absolute value of a difference between ($y_1$) and ($y_2$), which should be smaller than or equal to the predetermined maximum feed amount Y. If the distance exceeds the maximum amount Y, there should be interposed and registered between the two points one or more of additional points before registering the point at ($x_2$, $y_2$). The number of points to be registered in addition will be an integer C which may be obtained by raising fractions of $C_1$ which will, in turn, be obtained by dividing the distance by the maximum amount Y.

Figure 14:
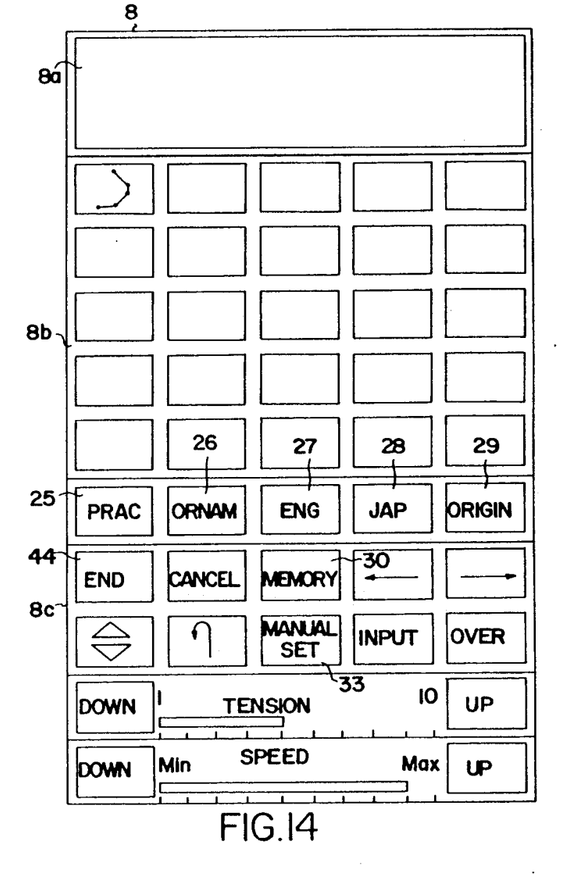
FIG. 14 is an explanatory view of the display board indicating that the originated stitch pattern has been registered as one in a pattern list of a particular pattern group.

After the stitch pattern has been originated by sequentially registering the needle dropping points which will be sufficient to define the stitch pattern, "OVER" indication 92 is designated so that the procedure advances to a step (r) in which the originated stitch pattern is registered in the particular pattern group which will at that time now will appear in the list 8b in the display board 8. For example, FIG. 14 shows the display board 8 when the original pattern group has been designated by "ORIGINAL". After designation of "OVER" 92, the originated stitch pattern may be registered as one in the original pattern group by designation of one of blank sections in the list 8b. In the illustrated example, the originated stitch pattern has been registered in the first display sections in the list 8b, which will become selectable in the step (f) in the main routine by designation of the first display section. Upon registration, the originated stitch pattern will be represented on a reduced scale on the display section thereof. Of course, any originated stitch pattern may be registered as one of the practical, ornamental, English-character or Japanese-character pattern, as far as at least one blank display section remains in the list 8b, in which case the equivalent operation mode should have been selected in the step (d) in the main routine.

Figure 9:
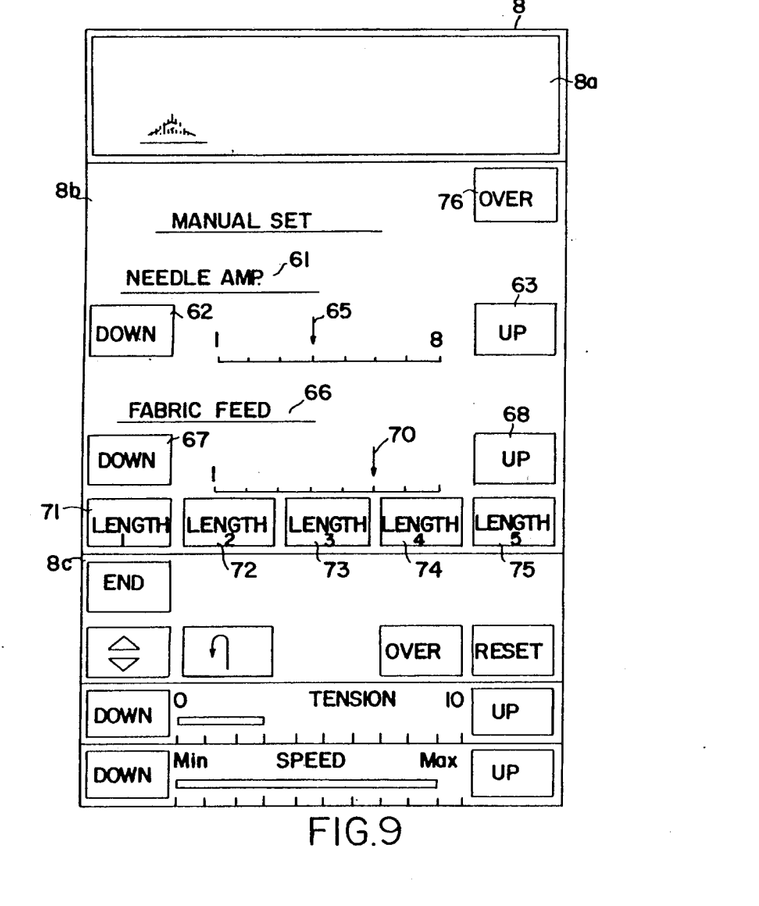
FIG. 9 through FIG. 11 are explanatory views of the display board, pictures of which have been changed to manual set mode in the operation modes shown in FIG. 6, FIG. 8 and FIG. 5 respectively.

As to each of the stitch patterns registered in the respective pattern groups, the standard size thereof will be determined by the stitch control data stored in the ROM memory 37 but may optionally be changed by "MANUAL SET" operation which commences in response to depression of the key section 7f to designate "MANUAL SET" indication 33 in the function key arrangement 8c of the display board 8. More particularly, when "MANUAL SET" 33 is designated after the triangular stitch pattern has been selected from those of the ornamental pattern group appearing in the list 8b (FIG. 6), the picture on the display board 8 will be changed to the manual set mode as shown in FIG. 9. The needle amplitude has been predetermined to be 4 mm by the stitch control data for the triangular stitch pattern, which may be decreased or increased by 1 mm per slight touching of the key section 7g or 7h to designate "DOWN" 62 or "UP" 63. The actual needle amplitude will be indicated by an arrow 65. The actual needle amplitude should not exceed a predetermined amount of the maximum needle amplitude which is indicated at 61. In like manner, the fabric feeding amount which has originally been set to be 6 mm may be adjusted by "DOWN" 67 or "UP" 68 within the predetermined maximum amount indicated at 66. A current degree of the fabric feeding amount is indicated by an arrow 70. The length of the triangular stitch pattern may be increased by designation of one of elongation keys 71 to 75. After completing the "MANUAL SET" operation, "OVER" 76 is designated so that the stitch control data stored in the ROM memory 37 will be so changed and the picture on the display board 8 will be returned to the last operation mode.

Figure 10:
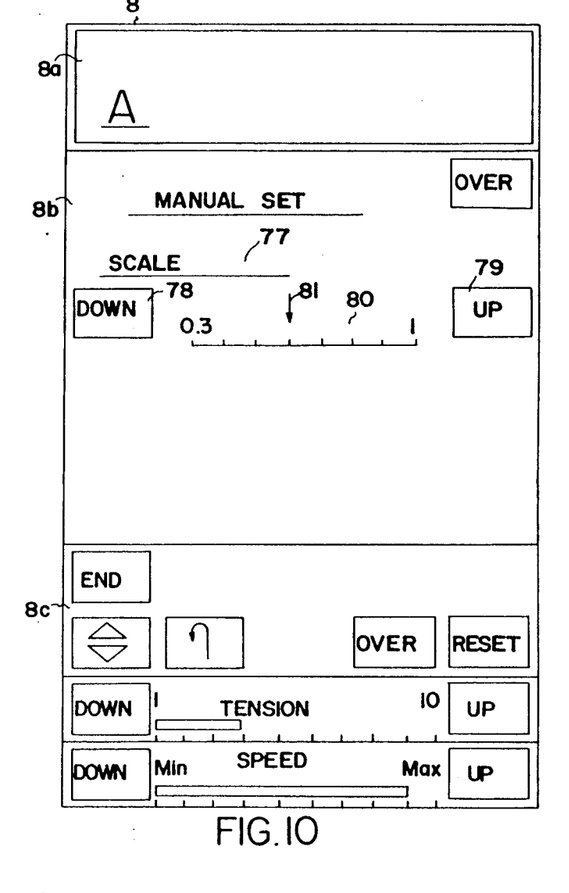
Figure 11:
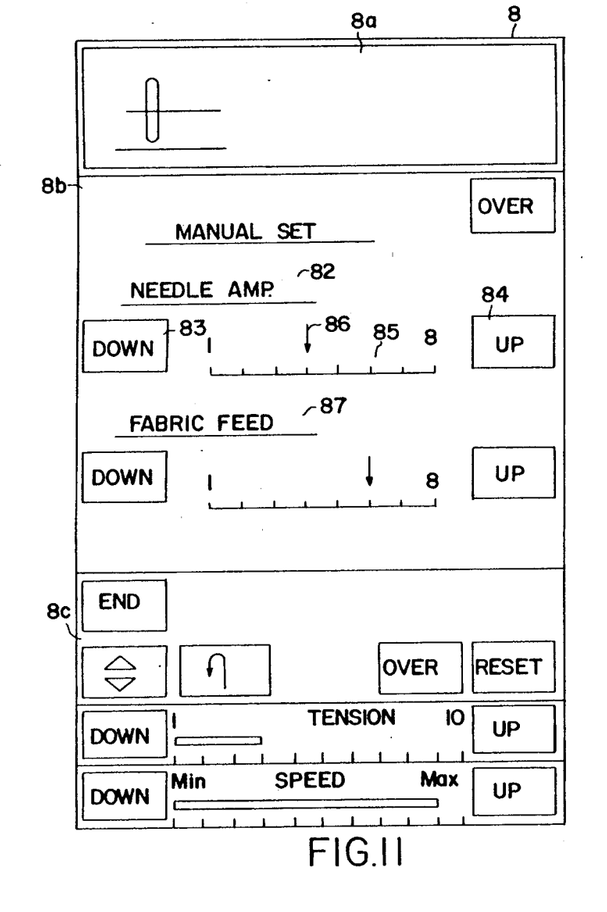

The "MANUAL SET" operation mode for the stitch pattern which belongs to the practical pattern group is shown by way of example in FIG. 11 which is similar to that in the case of the ornamental stitch pattern but different in that no elongation keys are arranged. The "MANUAL SET" operation mode for the stitch pattern classified into the English or Japanese character pattern group is shown by way of example in FIG. 10 which has a different picture. The manual adjustment of the stitch control data of this kind of the stitch pattern will be made by reducing or increasing the needle amplitude and the fabric feeding amount on the same scale to prevent deformation of the predetermined shape thereof.

Although the invention has been described in conjunction with a specific embodiment thereof, it is to be understood that many variations and modifications may be made without departing from spirit and scope of the invention as defined in the appended claims. The concept underlying the invention may be applied to a different type sewing machine provided with first and second feed means for feeding the fabric in four directions. Another type stitching instrument having a detachable, 4-way shiftable embroidery frame by which the fabric is supported in a stretched manner. When the characteristic features of the invention will be applied to a sewing machine of such different types, both the longitudinal and transverse distances between the two points should preferably be considered in the step (n) in the sub routine.

What is claimed is:

1. A stitch pattern select/input system in an electronically controlled sewing machine having first memory means for storing stitch control data for a plurality of stitch patterns; second memory means for storing display control data for the stitch patterns; and stitch forming means for producing every stitch of the stitch pattern in response to the stitch control data thereof; said system comprising display means on which a selective one of first and second information menus appears, said first information menu being partitioned into a pattern list section for representing the stitch patterns having the stitch control data stored in said first memory means and a pattern display section for representing the selected stitch pattern, said second information menu being applicable to input of a series of needle dropping points to originate a stitch pattern; switch means for switching operational conditions of said display board between said first and second information menus; input means providing a plurality of operating keys and cooperating with display means; and control means for controlling operation of said input means in dependence upon the information menu appearing on said display means such that by designation of a corresponding one of said operating keys, a specific one of the stitch patterns listed in said pattern list section may be selected when said display means is operable in said first information menu, said stitch pattern thus selected being represented in said pattern display section in response to the display control data thereof stored in said second memory means, and when said display means is operable in said second information menu, each needle dropping point for defining the stitch pattern to be originated may be registered at a desired point, the stitch control data and the display control data of said originated stitch pattern being stored in said first and second memory means and selectable when said display means operates in said first information menu.

2. A stitch pattern selection system for use in an electronically controlled sewing machine having first memory means (37) for storing stitch control data for a plurality of stitch patterns; second memory means (38) for storing display control data for the stitch patterns; and stitch forming means (13,15,17,19) for producing every stitch of the stitch pattern in response to the stitch control data thereof; said system comprising display means (8) partitionable into a pattern list section (8b) for representing in a lump the stitch patterns belonging to one of pre-classified groups and a pattern display section (8a) for representing at least one selected stitch pattern; a transparent panel (7) overlying said pattern list section and including a plurality of operating keys (22,40,41,43 ...) each corresponding to the stitch pattern appearing in said pattern list section; control means (9) for controlling representation of at least one of the stitch patterns in said pattern display means by operation of at least one of the corresponding operating keys, said control means utilizing display control data stored in said second memory means while controlling said representation said stitch patterns being stitchable by operation of said stitch forming means in response to the stitch control data thereof stored in said first memory means; and pattern group select means (25-29) included in said display means for selecting a different stitch pattern group from that appering in said pattern list section so that at least one of the stitch patterns belonging to the different stitch pattern group may be selected by operation of at least one of the corresponding operating keys.

* * * * *